United States Patent [19]

Imanaka et al.

[11] Patent Number: 5,155,716
[45] Date of Patent: Oct. 13, 1992

[54] SERVO SYSTEM FOR OPTICAL RECORDING/REPRODUCING DRIVE

[75] Inventors: Ryoichi Imanaka; Masayoshi Abe; Yasuhiro Tai, all of Osaka, Japan

[73] Assignee: Matsushita Electric Industrial Co., Ltd., Osaka, Japan

[21] Appl. No.: 703,639

[22] Filed: May 21, 1991

[30] Foreign Application Priority Data

May 22, 1990 [JP] Japan .................. 2-131561

[51] Int. Cl.⁵ .............................................. G11B 7/00
[52] U.S. Cl. ................................. 369/44.32; 369/32; 369/33
[58] Field of Search ............... 369/44.41, 44.11, 44.29, 369/44.42, 44.32, 44.33, 32, 33, 44.27, 44.34, 44.35, 44.36, 44.25, 59, 100, 124; 360/75, 10.3; 358/342

[56] References Cited

U.S. PATENT DOCUMENTS

| | | | |
|---|---|---|---|
| 4,485,414 | 11/1984 | Baker | 360/75 |
| 4,651,314 | 3/1987 | Yoshikawa et al. | 369/44.29 |

Primary Examiner—Roy N. Envall, Jr.
Assistant Examiner—Hung Dang
Attorney, Agent, or Firm—Lowe, Price, LeBlanc & Becker

[57] ABSTRACT

A digital servo system for use in an optical recording-/reproducing apparatus equipped with an optical system for illuminating an optical recording medium with a light beam to record and reproduce an information signal on and from the optical recording medium, the servo system being for more accurately performing a tracking and focusing control of the light beam with respect to the optical recording medium. The servo system is provided with a plurality of photodetectors to obtain a servo error signal which is in turn supplied to an attenuator and then supplied to an analog-to-digital converter to be digitized so as to constitute a digital filter. The servo system is arranged so as to set the attenuation factor of the attenuator so that the input signal of the analog-to-digital converter is kept in a predetermined range. This permits the tracking and focusing control with a high precision and further allows an AGC amplifier having a high-speed automatic gain-controllable function to be arranged to be digitally controllable.

5 Claims, 5 Drawing Sheets

SERVO SYSTEM FOR OPTICAL RECORDING/REPRODUCING DRIVE

BACKGROUND OF THE INVENTION

The present invention relates generally to drives for optically recording and reproducing an information signal using an optical recording medium such as an optical disk, and more particularly to a servo system for use in such a optical recording/reproducing drive which is arranged so as to improve the focusing servo and the tracking servo to allow higher recording/reproducing accuracy.

Generally, in recording/reproducing systems using an optical disk is known the so-called heat recording system where a laser beam spot having a diameter of about 1 μm is formed on a recording film provided on a track of an optical disk so as to allow physical variation of the recording film due to local temperature increase to record the information signal. One conventional servo system will be described hereinbelow with reference to FIG. 1. In FIG. 1, illustrated at numeral 50 is an optical disk equipped with pregroups and illustrated at numeral 52 is a light source such as a laser light source. The light beam emitted from the light source 52 passes through a collimator lens 53 so as to be converted into a parallel light beam, which is in turn reflected by means of a beam splitter 54 and then condensed onto the optical disk 50 through an objective lens 55. On the other hand, the reflected light beam from the optical disk 50 passes through the objective lens 55 and further through the beam splitter 54 so as to be directed to photodetectors 57 and 58. The outputs of the photodetectors 57 and 58 are respectively inputted to a gain-variable differential amplifier 59 the output of which is supplied to an equalizer 60 and further to a drive amplifier 61. The output of the drive amplifier 61 is led to a tracking drive apparatus 56, which in turn moves the objective lens 55 radially with respect to the optical disk 50 to perform the tracking servo operation. In the tracking servo operation, in the case of recording the information signal on the optical disk 50, the output power of the laser light source 52 is increased and the output light of the laser light source 52 is modulated in accordance with the information signal, thereby effecting the head recording on the optical disk 50. At this time, since the power of the light incident on the tracking servo photodetectors 57 and 58 becomes increased, the gain of the tracking servo loop increases so as not to satisfy the optimal servo condition. Thus, the gain of the gain-variable differential amplifier 59 is required to be controlled by the output of an addition amplifier 63 so that the magnitude of the difference signal (a tracking signal) between the outputs of the photodetors 57 and 58, i.e., the output of the gain-variable differential amplifier 59, becomes constant. As the result of the gain control, the output of the gain-variable differential amplifier 59 takes a value to be obtained by dividing its input by the output of the addition amplifier 63 (standardization). Thus, the magnitude of the tracking error signal is controllable to substantially become constant irrespective of the exchange of the optical disk 50. Numeral 64 is a filter for performing the AGC control (the control of the gain-variable differential amplifier 59) with an optimal frequency characteristic.

Although as described above the conventional tracking servo system is arranged such that the gain-variable differential amplifier is used in order to make constant the servo loop gain of the optical disk to optimize the operation of the servo loop, there is a problem which arises with such an arrangement, however, in that the control precision of the AGC control can become insufficient when the gains and offsets of the addition amplifier 63 and gain-variable differential amplifier 59 vary because the AGC control loop cannot be constructed as a closed loop. In addition, the AGC control system is required to be also provided for the focusing servo system to thereby result in increase in the circuit amount and increase in the manufacturing cost.

SUMMARY OF THE INVENTION

It is therefore an object of the present invention to provide a servo system for an optical recording/reproducing drive which is capable of realizing a high control precision with a simple arrangement.

A servo system for use in an optical recording/reproducing apparatus equipped with an optical system for illuminating an optical recording medium with a light beam to record and reproduce an information signal on and from the optical recording medium, the servo system being for performing a tracking and focusing control of the light beam with respect to the optical recording medium, comprising: photodetector means responsive to reflection light from the optical recording medium due to the light illumination of the optical system so as to output electric signals in correspondance with the incident light quantities; differential amplifier means responsive to the electric signals from the photodetector means so as to take the difference therebetween to output a servo error signal; adder means responsive to the electric signals from the signals to output a sum signal; attenuator means responsive the servo error signal from the differential amplifier means and further responsive to the sum signal from the adder means so as to respectively attenuate the servo error signal and the sum signal with an attenuation factor which is changeable in accordance with a digital signal to be inputted; multiplexer means for successively selecting the outputs of the attenuator means; analog-to-digital converter means for successively converting the outputs of the multiplexer means into digital signals; and digital processing means responsive to digital data corresponding to the servo error signal and the sum signal from the analog-to-digital converter means, the digital processing means comparing the digital data with a predetermined value so as to output the digital signal to the attenuator means to set the attenuation factor of the attenuator means whereby the input signal of the analog-to-digital converter means is in a predetermined range and standardizing the digital data corresponding to said servo error signal with the digital data corresponding to the sum signal so as to perform a filter calculation with respect to the standardized servo error data to output a servo drive signal whereby the optical system is driven to effect the tracking and focusing control.

Preferably, when the attenuation factor of the attenuator means at the inputting of the servo error signal is 1/x, the digital data after the analog-to-digital conversion of the servo error signal is A, the attenuation factor of the attenuator at the time of the inputting of the sum signal is 1/y and the digital data after the analog-to-digital conversion of the sum signal is B, the digital processing means calculates an equation $A \cdot x/(B \cdot y)$ to obtain the standardized servo error data. When the attenuation factor of the attenuator means at the time of the inputting of the sum signal is 1/z, the digital processing means sets the attenuation factor of the attenuator means at the time of the inputting of the servo error signal with data obtained by multiplying z by the digital data after the analog-to-digital conversion of the sum signal whereby the digital data corresponding to the servo error signal is standardized with the digital data corresponding to said sum signal.

Further, preferably, a portion of a passage for inputting the servo error signal is arranged to be set to a predetermined electric potential at a predetermined time interval so that the set electric potential is registered as correction data to a register means, the digital processing means performing an offset correction with respect to the servo error signal and the sum signal on the basis of the registered correction data. The optical system is arranged to set its output to zero at a predetermined time so that the output of the photodetector means at the predetermined time is supplied as correction data to the analog-to-digital converter means so as to be registered to a register means, the digital processing means performing an offset correction with respect to the servo error signal and the sum signal on the basis of the registered correction data.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Figure 1:
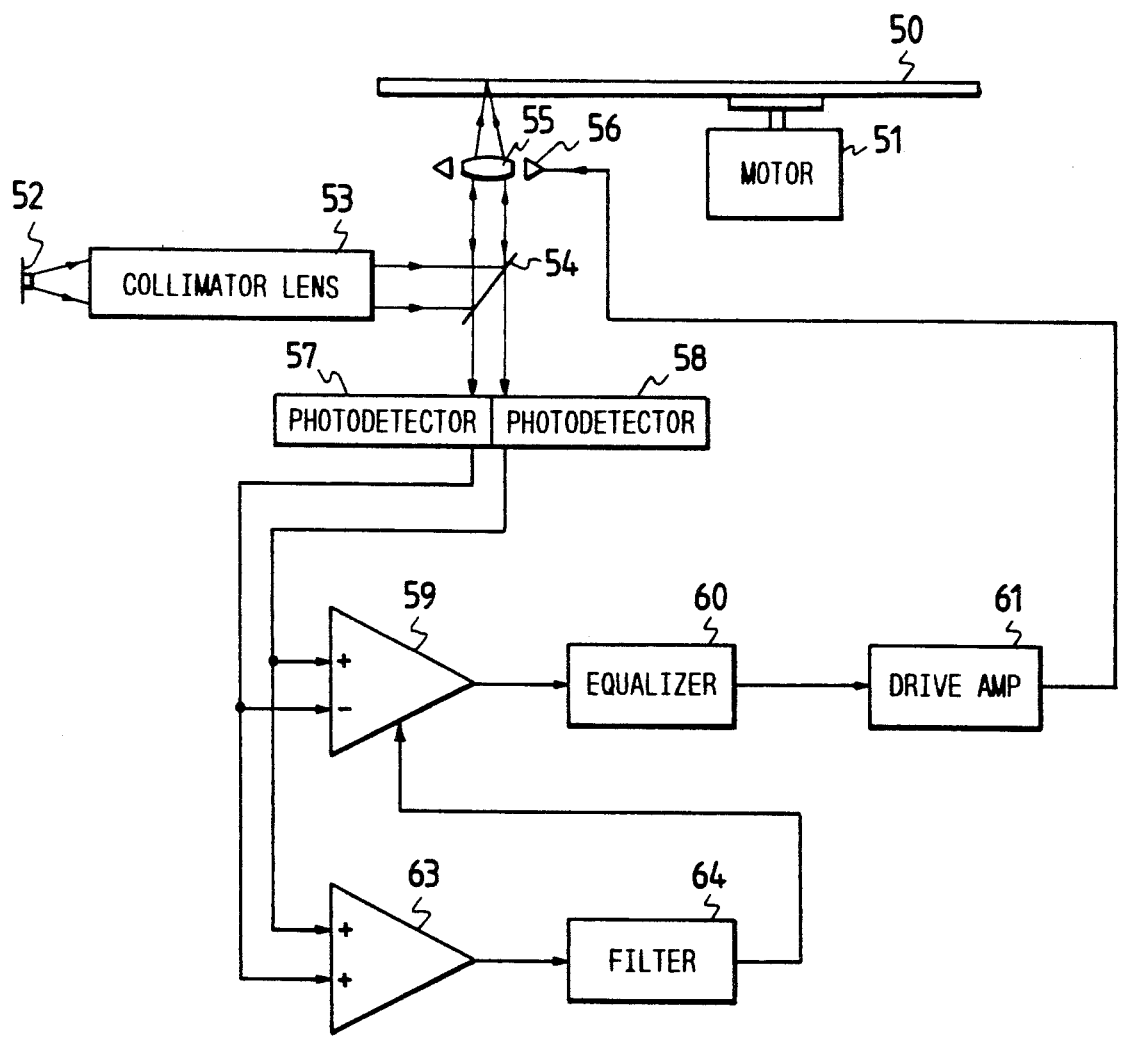
FIG. 1 is a block diagram showing an arrangement of a conventional tracking servo system.
Figure 2:
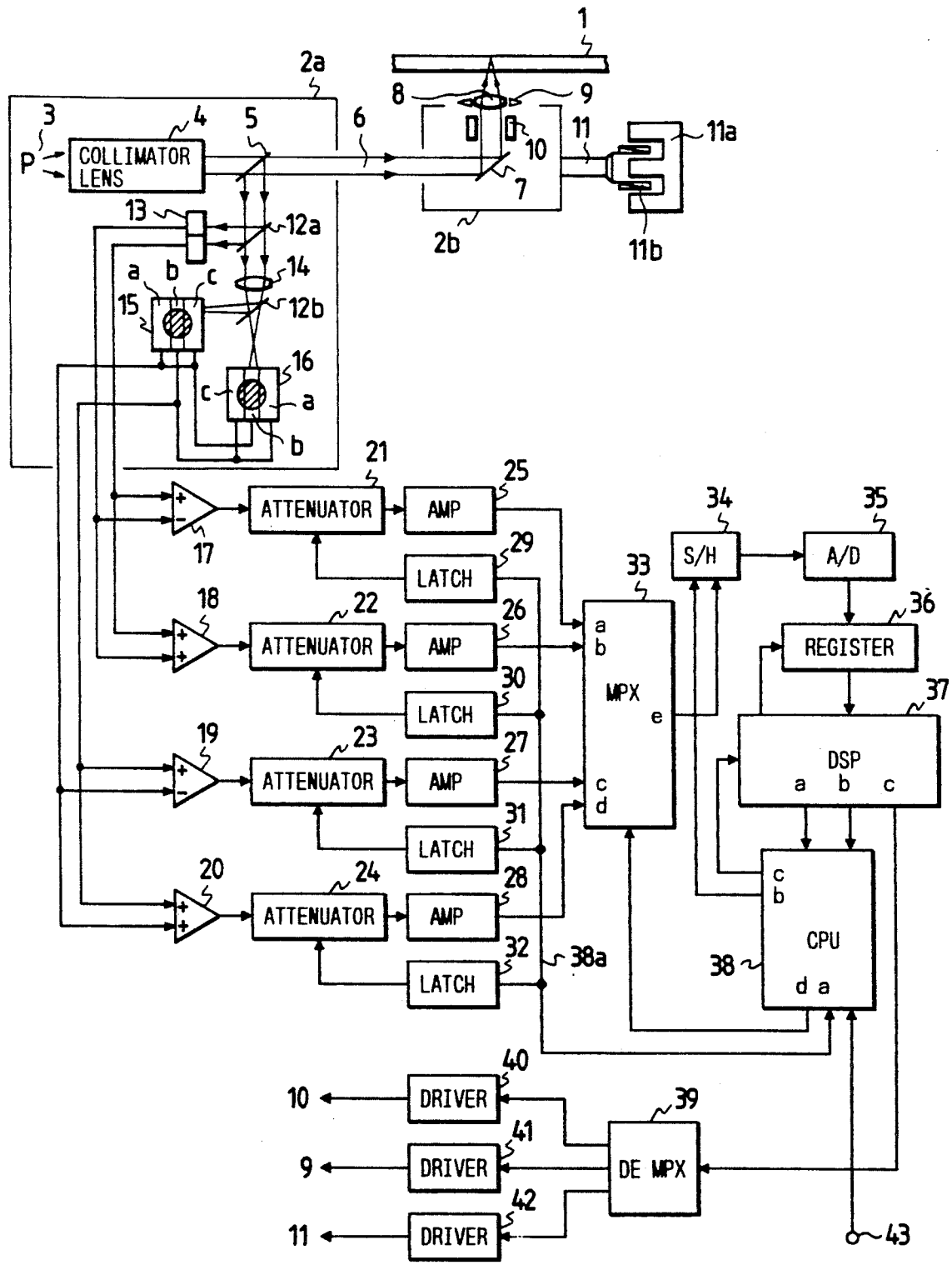
FIG. 2 is a block diagram showing an arrangement of a servo system according to an embodiment of the present invention.

Referring now to FIG. 2, there is illustrated a servo system according to an embodiment of the present invention. In FIG. 2, illustrated at numeral 1 is an optical disk, illustrated at 2a is a fixed optical system for recording and reproducing an information signal from and on the optical disk 1 and illustrated at 2b is a movable optical system. The fixed optical system 2a is composed of a laser light source 3, a colimator lens 4, a beam splitter 5, half-mirrors 12a, 12b and photodetectors 13, 15, 16. The laser light source 3 emits a laser light beam which in turn passes through the collimator lens 4 so as to be converted into a parallel light beam. The parallel light beam from the collimator lens 4 passes through the beam splitter 5 before being outputted from the fixed optical system 2a toward the movable optical system 2b. In the movable optical system 2b, the incident parallel light beam 6 from the fixed optical system 2a is first reflected by means of a mirror 7 to reach an objective lens 8 so as to be focused with respect to a recording layer of the optical disk 1. Here, the parallel light beam 6 is arranged to have a diameter greater than the effective diameter of the objective lens 8. Illustrated at numeral 9 is a tracking actuator for moving the objective lens 8 with respect to the parallel light beam, i.e., moving the objective lens 8 radially with respect to the optical disk 1. Numeral 10 represents a focusing actuator for moving the objective lens 8 in directions perpendicular to the surfaces of the optical disk 1. The movable optical system 2b comprising the mirror 7, objective lens 8, tracking actuator 9 and focusing actuator 10 is arranged to be radially movable with respect to the optical disk 1 by means of a linear actuator 11. The linear actuator 11 is composed of a coil 11b and a magnetic circuit 11a.

On the other hand, the light beam reflected on the optical disk 1 passes through the objective lens 8 so as to be again converted into a parallel reflection light beam which reaches a photodetector 13 through the mirror 7, beam splitter 5 and half-mirror 12a. The photodetector 13 is divided into two portions so as to output two electric signals in response to the reception of the parallel reflection light beam from the optical disk, the two electric signals being led to a differential amplifier 17 to take the difference between the two electric signals outputted from the two portions of the photodetector 13 to obtain a far-field tracking error signal. Further, illustrated at 14 is a lens which is positioned between the half-mirrors 12a and 12b and which is also responsive to the parallel reflection light beam from the optical disk 1 after being reflected by the beam splitter 5. After passing through the lens 14, the reflection light beam reaches the half-mirror 12b so as to be divided into two portions which in turn direct to second and third photodetectors 15 and 16. The lens 14 is arranged to cause the parallel reflection light beam to be focused at the intermediate position between the half-mirror 12 and the third photodetector 16. That is, the second and third photodetectors 15 and 16 receive the reflection light beams at positions before and after the local points. At this time, the focusing actuator 9 is controlled so that the diameters of the divided reflection light beams become constant, thereby performing the focusing control. Each of the second and third photodetectors 15 and 16 is divided into three photodetecting portions, and the photodetecting portions a and c of the second photodetector 15 are coupled to the photodetecting portion b of the third photodetector 16 and the photodetecting portions b of the second photodetector 15 is coupled to the photodetecting portions a and c of the third photodetector 16. The respective outputs of the second and third photodetectors 15 and 16 are coupled to a differential amplifier 19 so as to obtain a difference signal therebetween, i.e., a focusing error signal. Numeral 18 is an adder coupled to the first-mentioned tracking error signal detection photodetector 13 so as to obtain a tracking addition (or sum) signal corresponding to the light quantity incident on the first photodetector 13, and numeral 20 represents an adder coupled to the second and third photodetectors 15 and 16 so as to obtain a focusing addition signal corresponding to the light quantity incident on the second and third photodetectors 15 and 16. That is, the adder 18 outputs a signal indicative of the sum total output of the tracking error signal detector and the adder 20 outputs a signal indicative of the sum total output of the focusing error signal detector. Thus, it is possible to simultaneously obtain the servo error signals and the signals representative of the sum totals of the photodetector outputs.

As illustrated in FIG. 2, the differential amplifiers 17, 19 and adders 18, 20 are respectively coupled to attenuators 21 to 24 which are in turn coupled respectively to amplifiers 25 to 28. The attenuators 21 to 24 are also coupled respectively latch circuits 29 to 32 which are respectively coupled to a central processing unit (CPU) 38 to store data therefrom and set the attenuation amounts of the respective attenuators 21 to 24 in accordance with the stored data. The amplifiers 25 to 28 are respectively coupled to a multiplexer (MPX) 33 for selecting one of the outputs (33a to 33d) of the amplifiers 25 to 28 and outputting a signal indicative of the selected output to a sample-and-hold circuit (S/H) 34. The output of the sample-and-hold circuit 34 is supplied to an analog-to-digital converter (A/D) 35 so as to be converted into the corresponding digital signal. The output of the analog-to-digital converter 35 is supplied to a register 36 to be temporarily stored therein. Numeral 37 denotes a digital signal processor (DSP) which acts as a digital filter. Here, the TMS320C25 manufactured by TI Co., Ltd can be used as the digital signal processor 37, for instance. The DSP 37 is arranged such that the A/D-converted and standardized servo error signal is passed through an equalizer due to the digital filter so as to optimize the response of the servo system. The output signal of the DSP is supplied to a demultiplexer (DE-MPX) 39 so as to be converted into parallel signals which are in turn supplied as drive signals to actuator drivers 40 to 42 whose outputs are respectively supplied to the tracking actuator 9, focusing actuator 10 and linear actuator 11, thereby constituting the servo system. The CPU 38 supplies a portion of the data processed in the DSP 37 through an address data bus 38a to the above-mentioned latch circuits 29 to 32 so as to set the attenuation amounts of the attenuators 21 to 24. In addition, the CPU 38 generates an output b to the sample-and-hold circuit 34 in order to determine the sampling timing of the sample-and-hold circuit 34, and further generates an output c to the DSP 37 in order to determine the timing of the data exchange therebetween, and still further generates an output d to the MPX 33 for determining the switching timing of the MPX 33. The DE-MPX 39 is for again converting the data time-division-processed in the DSP 37 into parallel data. For instance, the DE-MPX 39 is equipped with a plurality of counters to count the time-divided serial data to produce a pulse train having pulse widths corresponding to the serial data, the PWM (pulse-width modulation) outputs being supplied to the actuator drivers 40 to 42 so as to control the drives of the tracking actuator 9, focusing actuator 10 and linear actuator 11. Numeral 43 represents a mode signal input terminal which is responsive to a mode signal for setting the servo system to the recording mode, reproducing mode or erasing mode.

Figure 3:
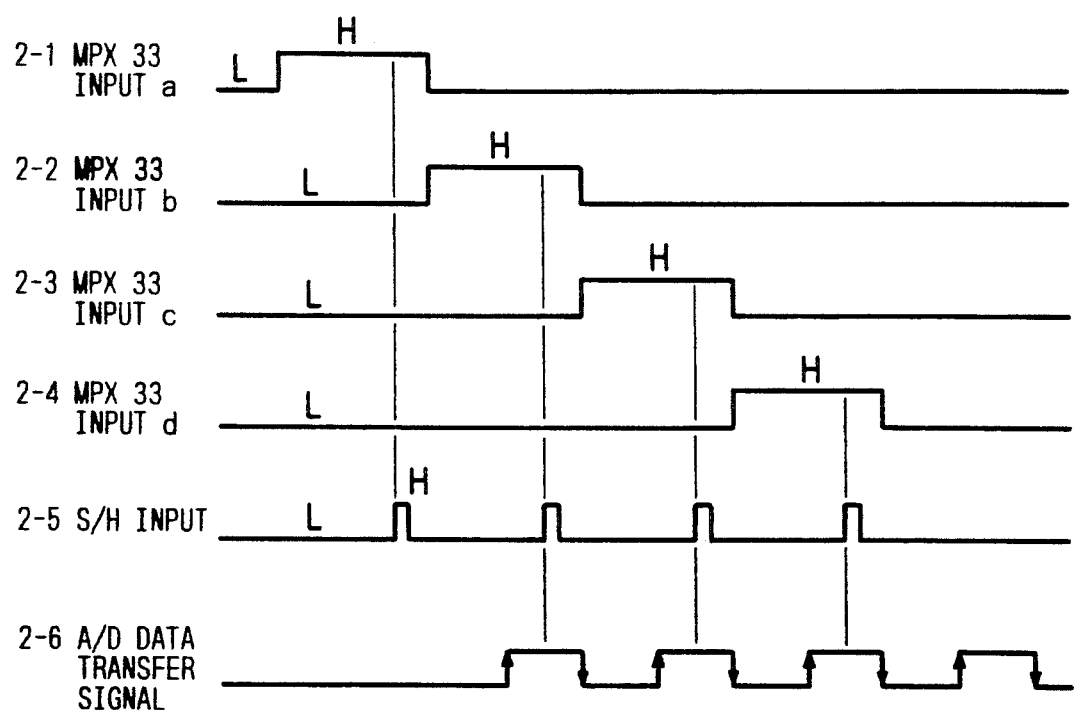
FIG. 3 is a timing chart for describing the operation timing of the FIG. 2 servo system.

A description will be made hereinbelow with reference to FIGS. 3 to 5 in terms of the operation of the above-described servo system. FIG. 3 is a timing chart when inputting the data through the register 36 to the DSP 37, the data being obtained with the input data selected by the MPX 33 being sampled and held by sample-and-hold circuit 34 and converted into a digital form by the A/D converter 35. In FIG. 3, references 2-1 to 2-4 represent the connection timings of the switch of the MPX 33. For example, the reference 2-1 indicates that the input a of the MPX 33 is coupled to the output e of the MPX 33 when being in the high level state, and the reference 2-5 indicates a sample-and-hold pulse to be inputted to the sample-and-hold circuit 34. The voltage value held in response to the sample-and-hold pulse 2-5 is converted by the A/D converter 35 into a digital signal which is in turn read to the register 36 in response to the rising edge of a signal illustrated at reference 2-6 and then inputted to the DSP 37 in response to the falling edge of the 2-6 signal. As obvious from above, the inputs a to d of the MPX 33 are supplied to the DSP 37 in the time-divided state.

Secondly, a description will be made hereinbelow with reference to FIGS. 4 and 5 in terms of the processing order of the signals inputted to the DSP 37. The input a (a tracking error signal) and input b (a tracking addition signal) of the MPX 33 are respectively inputted to the DSP 37 in the time-divided form so as to be processed in the order as illustrated by a flow chart of FIG. 4. Here, the flow charts of FIGS. 4 and 5 show the case that the servo system illustrated in FIG. 2 reaches the steady state, and the interval of the data reception may be set to about 10 $\mu$sec. In the flow chart of FIG. 4, the setting of the attenuation amount of the attenuator 21 is made through a calculation operation so that the tracking error signal a is divided by the tracking addition signal b (standardized). The divided data is filter-calculated and then outputted to the DE-MPX 39. The filter calculation corresponds to the equalizer function of the above-mentioned tracking servo system and is effected in order to optimize the response of the tracking servo system. On the other hand, in the flow chart of FIG. 5, under the condition that the amplifiers 25 and 26 are operable in adequate input ranges, the attenuators 21 and 22 are arranged so that the tracking error signal is divided by the tracking addition signal. The standard filter calculation is effected using the division result and the filter calculation result is outputted to the DE-MPX 39. In this case, in order to correct the portions of the inputted data A and B attenuated in the corresponding attenuators, the attenuation factors 1/x and 1/y are used so as to calculate A·x/(B·y), the calculation result being filter-calculated and then outputted to the DE-MPX 39. The attenuation factors of the attenuators to be used in the calculation are the values effective when passing through the attenuators. Thus, in the case that a time (for example, 10 $\mu$sec) is necessary until the attenuator operates in accordance with the set value, after the attenuation factor setting data are inputted through the latch circuits 29 and 30 to the attenuators 21 and 22, the calculation is effected by using the attenuation data of the attenuator set before the input of the data in consideration of the necessary time (delay time).

Figure 4:
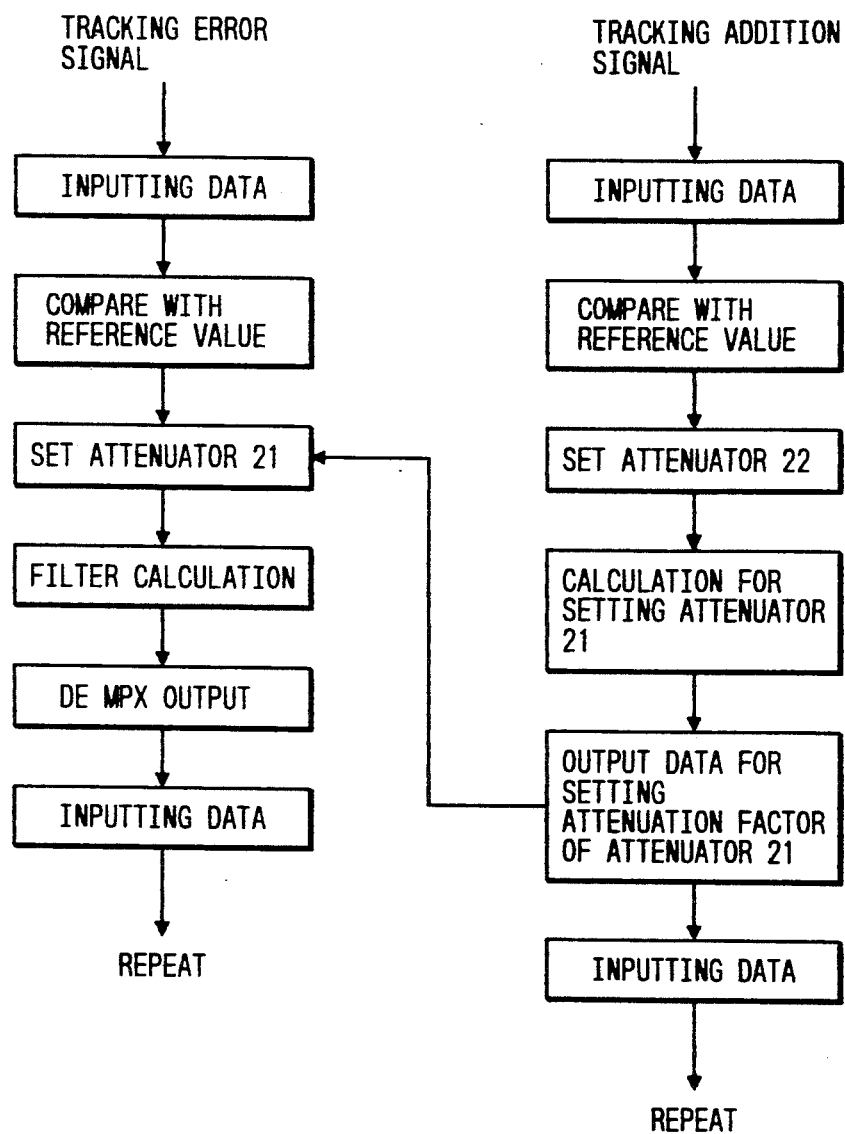
FIGS. 4 and 5 are flow charts for describing the operation of the FIG. 2 servo system.
Figure 5:
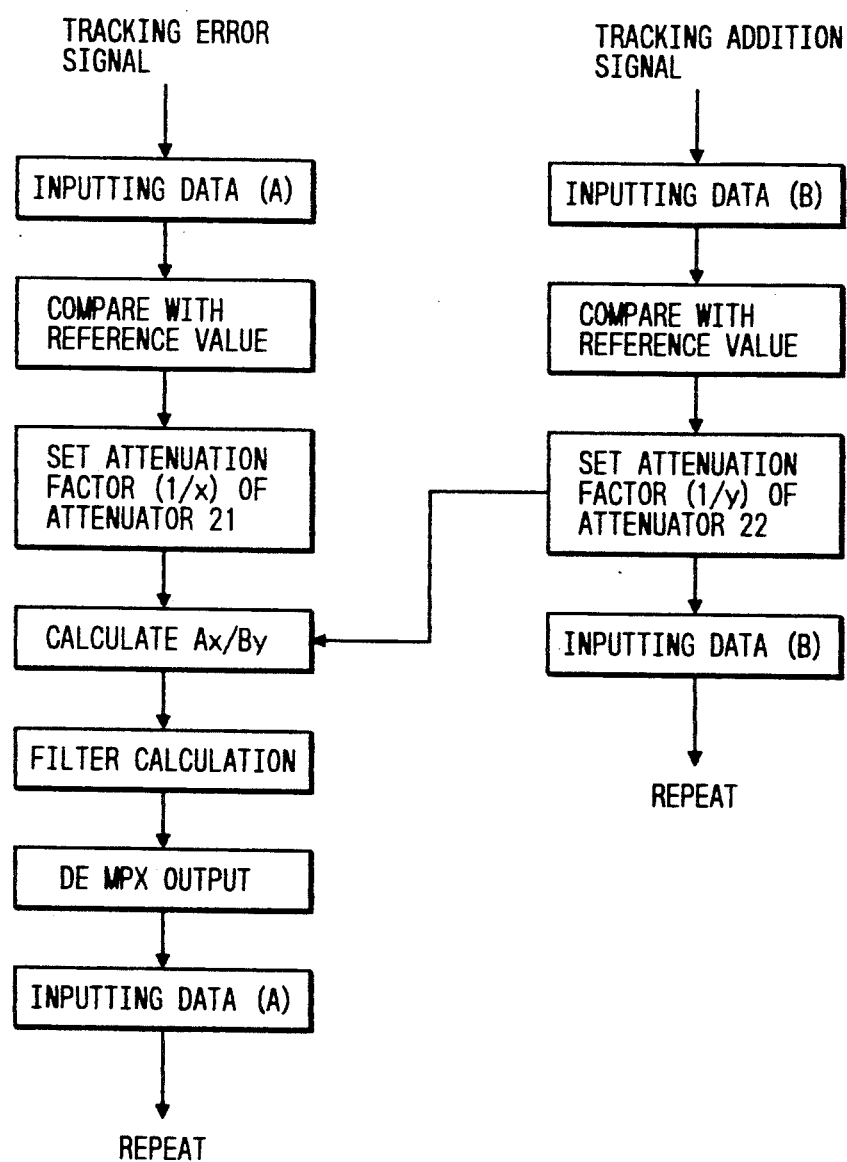

In the flow charts of FIGS. 4 and 5, all the data inputted are always compared with a reference value so as to prevent the deviation from the operation ranges of the amplifiers 25 and 26. For instance, in the case that the A/D converter 35 has an 8-bit structure, the reference value may be set to ±70% with respect to the central value. Here, the flow charts of FIGS. 4 and 5 respectively advance in the time-division state, while the flow chart for processing the servo error signal may be executed with less delay time and the other flow chart may be executed so as to ensure the operation of the minimum condition. Accordingly, in the execution of the flow chart, the operation time (for example, between the input of data and the comparison with the reference value) is not constant. Although the above description has been made in terms of the tracking servo system, it is also possible to perform the above-described operation for the focusing servo system. Further, a description of the loop for controlling the linear actuator 11 is omitted.

In the case that the FIG. 2 recording/reproducing drive receives the recording command through the mode signal input terminal 43 when being in the reproducing state, the output of the laser light source 3 is modulated in accordance with the information signal to be recorded and further enhanced up to about 5 or 6 times the normal state. At this time, the light quantities to be incident on the photodetectors 13, 15 and 16 are also enlarged whereby the amplifiers 25 and 26 enter into the saturated states. In addition, since the speed for changing the laser power from the reproducing state to the recording state is high (1 to 2 $\mu$sec), in the case of supplying the data through the DSP 37 to the attenuators 21 to 24, the time is required so that difficulty is encountered to normally operate the servo system. For this case, the CPU 38 is arranged to supply the attenuators 21 to 24 with data for changing the attenuation factors prior to the recording operation. After reaching the steady state, the operations as illustrated by the flow charts of FIGS. 4 and 5 are executed, thereby improving the accuracy of the servo system.

The differential amplifiers 17, 19 and the amplifiers 25 to 28 generally have the offset variations. Thus, in this invention, the inputs of the differential amplifiers 17 and 18 are temporarily shorted at a predetermined time interval, and at that time the data (correction data) are independently inputted to the A/D converter 35 so as to be registered to the register 36 and the MPX 33 selects the outputs of the differential amplifiers 17, 18 and the amplifiers 25 to 28 so that, in terms of the servo error signal, the correction data inputted to the register 36 is subtracted from the data inputted to the A/D converter 35. Although the shorting arrangement is not illustrated, it is appropriate that, with analog switches or the like being inserted into the input stages of the differential amplifiers 17, 19 and/or the adders 18, 20, the CPU 38 gives a shorting command for an extremely short time below 100 $\mu$sec. This allows easily obtaining the correction data even if the system is in operation. Accordingly, it is possible to normally operate the system irrespective of the offset variations of the differential amplifiers and amplifiers. For obtaining the correction data, it is also appropriate to correct the offsets of the differential amplifier 17 and the amplifier 25 on the basis of the fact that, when the light beam formed by the objective lens 8 is at a mirror portion of the optical disk 1, the output of the differential amplifier 17 becomes zero. Moreover, it is also appropriate to correct the drifts of the photodetectors, differential amplifiers, amplifiers and A/D converter on the basis of the fact that, when the output of the laser light source 3 is temporarily set to zero, all the outputs of the photodetectors become zero. This correcting operation may be set to be completed with a short time below 100 $\mu$sec, whereby it is possible to easily obtain the correction data even if the system is in the operation such as reproducting operation.

Here, in the case of performing the offset correction, the attenuation factor of the attenuator is arranged to vary, so that the offset amount generated at the input side of the attenuator and the offset amount generated in the amplifier disposed at the output side thereof are separately detected so as to change the value of the correction data in accordance with the attenuation factor of the attenuator. For instance, in FIG. 2, in the case that the input of the differential amplifier 17 is shorted, when the offset amount of the differential amplifier 17 is $V1$, the attenuation factor of the attenuator 21 is $G1$ and the offset amount of the amplifier 25 is $V2$, the output data $X1$ of the A/D converter 35 becomes as follows.

$$(V1 \cdot G1) + V2 = X1$$

When the attenuation factor of the attenuator 21 is changed from $G1$ to $G2$, the output data $X2$ of the A/D converter 35 becomes as follows.

$$V1 \cdot G2 + V2 = X2$$

From the aforementioned two equations, the offset amounts $V1$ and $V2$ are obtained. In terms of the offset amount $V1$, the correction data for the offset to be corrected by the attenuation factor of the attenuator 21 is changed so as to perform the correction of the output of the A/D converter 35. On the other hand, in terms of the offset amount $V2$, the correction is effected irrespective of the attenuation factor of the attenuator. Thus, it is possible to always obtain the correction data even if the attenuation factor of the attenuator varies.

As described above, although the conventional system is arranged such that the AGC device is provided each channel for detecting the servo error signal of the optical disk, according to the present invention, all the processes can be effected only with one channel, that is, the batch process can be achieved. Further, because of being arranged to control the attenuators 21 to 24 in accordance with the digital signal inputs, it is possible to easily suppress the DC drift and gain variation which are the problems inherent to the conventional analong type attenuator, thereby realizing the servo system with a high accuracy. In addition, the number of parts can be reduced and the adjusting time can considerably be reduced so as to realize the servo system with a low cost. Moreover, since the offset variations of the photodetectors, differential amplifiers, amplifiers and A/D converter can be corrected, thereby allowing the use of an element having a great offset variation.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention.

What is claimed is:

1. A servo system used to control an optical recording/reproducing apparatus equipped having an optical system for illuminating an optical recording medium with a light beam to record and reproduce an information signal on and from said optical recording medium, said servo system being used for performing tracking and focusing control of the light beam with respect to said optical recording medium, comprising:

photodetector means responsive to reflection light from said optical recording medium due to the light illumination of said optical system so as to output electric signals in correspondence with the incident light quantities;

differential amplifier means responsive to the electric signals from said photodetector means so as to take the difference therebetween to output a servo error signal;

adder means responsive to the electric signals from said photodetector means so as to take the sum of the electric signals to output a sum signal;

attenuator means responsive to said servo error signal from said differential amplifier means and further responsive to said sum signal from said adder means so as to respectively attenuate said servo error signal and said sum signal with an attenuation factor which is variable in accordance with the value of a digital signal to be inputted;

multiplexer means for successively selecting the outputs of said attenuator means;

analog-to-digital converter means for successively converting the outputs of said multiplexer means into digital signals; and digital processing means responsive to digital data corresponding to said servo error signal and said sum signal from said analog-to-digital converter means, said digital processing means comparing said digital data with a predetermined value so as to output said digital signal to said attenuator means to set the attenuation factor of said attenuator means whereby the input signal of said analog-to-digital converter means is in a predetermined range and standardizing said digital data corresponding to said servo error signal with said digital data corresponding to said sum signal so as to perform a filter calculation with respect to the standardized servo error data to output a servo drive signal whereby said optical system is driven to effect the tracking and focusing control.

2. A servo system as claimed in claim 1, under the conditions that the attenuation factor of said attenuator means at the input of said servo error signal is $1/x$, the digital data after the analog-to-digital conversion of said servo error signal is A, the attenuation factor of said attenuator when said sum signal is inputted in $1/y$ and the digital data after the analog-to-digital conversion of said sum signal is B, then said digital processing means calculates an equation $A \cdot x/(B \cdot y)$ to obtain the standardized servo error data.

3. A servo system as claimed in claim 1, wherein, when the attenuation factor of said attenuator means during the input of said sum signal has a value o $1/z$, said digital processing means sets the attenuation factor of said attenuator means when the input of said servo error signal with data obtained by multiplying z by the digital data after the analog-to-digital conversion of said sum signal whereby the digital data corresponding to said servo error signal is standardized with the digital data corresponding to said sum signal.

4. A servo system as claimed in claim 1, further comprising register means, and wherein a portion of a passage for inputting said servo error signal is arranged to be set to a predetermined electric potential at a predetermined time interval so that the set electric potential is registered as correction data to said register means, said digital processing means performing an offset correction with respect to said servo error signal and said sum signal on the basis of the registered correction data.

5. A servo system as claimed in claim 1, further comprising register means, and wherein said optical system is arranged to set its output to zero at a predetermined time so that the output of said photodetector means at the predetermined time is supplied as correction data to said analog-to-digital converter means so as to be registered to said register means, said digital processing means performing an offset correction with respect to said servo error signal and said sum signal on the basis of the registered correction data.

* * * * *